US010466948B2

(12) United States Patent
Shimazaki et al.

(10) Patent No.: US 10,466,948 B2
(45) Date of Patent: *Nov. 5, 2019

(54) IMAGE DISPLAY DEVICE, IMAGE DISPLAY CONTROL METHOD, AND IMAGE DISPLAY SYSTEM

(71) Applicant: Sharp Kabushiki Kaisha, Osaka (JP)

(72) Inventors: Sadahiko Shimazaki, Osaka (JP); Toshinori Furuhashi, Osaka (JP); Ryoichi Yonezawa, Osaka (JP); Junya Doi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,768

(22) Filed: Jul. 21, 2018

(65) Prior Publication Data
US 2018/0329663 A1 Nov. 15, 2018

Related U.S. Application Data

(63) Continuation of application No. 15/189,626, filed on Jun. 22, 2016, now Pat. No. 10,055,185.

(30) Foreign Application Priority Data

Jul. 3, 2015 (JP) ................................. 2015-133995

(51) Int. Cl.
*G06F 3/033* (2013.01)
*G09G 5/08* (2006.01)
(Continued)

(52) U.S. Cl.
CPC .............. *G06F 3/14* (2013.01); *G06F 1/1643* (2013.01); *G06F 3/0488* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2012/0162444 A1* | 6/2012 | Suda | ................... | G06F 3/03545 348/207.1 |
| 2014/0208277 A1* | 7/2014 | Makino | ................. | G06F 3/0488 715/863 |

(Continued)

FOREIGN PATENT DOCUMENTS

| | | |
|---|---|---|
| CN | 104364746 A | 2/2015 |
| JP | 2013-134387 A | 7/2013 |
| WO | 2014/142185 A1 | 9/2014 |

OTHER PUBLICATIONS

Allowed Claims from Parent U.S. Appl. No. 15/189,626, filed Jun. 22, 2016.

*Primary Examiner* — Insa Sadio
(74) *Attorney, Agent, or Firm* — Renner, Otto, Boisselle & Sklar, LLP (57) ABSTRACT

An image display device includes: a projection unit that projects and displays an image onto a screen; a superimposed image drawing unit that generates a superimposed image which is to be displayed to be superimposed on the image; a browser storage unit that stores a browser screen for controlling a display position of the superimposed image from a mobile terminal; a transmission unit that transmits the browser screen to the mobile terminal; a reception unit that receives display position information of the superimposed image obtained by an operation on the browser screen displayed on the mobile terminal; and a control unit that displays the superimposed image, which is generated by the superimposed image drawing unit, so as to be superimposed (Continued)

on the image projected by the projection unit on the basis of the received display position information of the superimposed image.

7 Claims, 10 Drawing Sheets

(51) Int. Cl.
    *G06F 3/14*          (2006.01)
    *H04N 9/31*         (2006.01)
    *G09G 3/00*         (2006.01)
    *G09G 5/02*         (2006.01)
    *G09G 5/14*         (2006.01)
    *G06F 3/0488*     (2013.01)
    *G06F 1/16*         (2006.01)

(52) U.S. Cl.
    CPC .......... *G06F 3/1438* (2013.01); *G06F 3/1454* (2013.01); *G09G 3/001* (2013.01); *G09G 5/026* (2013.01); *G09G 5/14* (2013.01); *H04N 9/3179* (2013.01); *G09G 2340/0464* (2013.01); *G09G 2340/12* (2013.01); *G09G 2340/14* (2013.01); *G09G 2370/16* (2013.01)

(56) References Cited

U.S. PATENT DOCUMENTS

2015/0130847 A1    5/2015   Masuoka et al.
2016/0004389 A1    1/2016   Iwatsuki \* cited by examiner

IMAGE DISPLAY DEVICE, IMAGE DISPLAY CONTROL METHOD, AND IMAGE DISPLAY SYSTEM

BACKGROUND OF THE INVENTION

1. Field of the Invention

The present invention relates to an image display device, an image display control method, and an image display system, which are used for a presentation or the like and allow an operation for a superimposed image on an image displayed by an image display device, and more particularly relates to those which are remotely controllable by a mobile terminal device.

2. Description of the Related Art

Conventionally, a laser pointer is generally used in a presentation as a device that points an arbitrary position of an image displayed by an image display device. A presentation speaker can efficiently make a presentation by using a pointer displayed by irradiation with the laser pointer.

Further, a remote controller has been in practical use as a device to remotely control an image display device. An infrared communication technology or a wireless communication technology is used as a communication technology between an image display device and a remote controller.

Further, Patent Document 1 (Japanese Unexamined Patent Publication No. 2013-134387) discloses an operation system of a display image in which a mobile terminal makes an access to a Web page provided by an image display device by a browser to acquire HTML data, generates an operation screen from the acquired HTML data, displays the generated screen, and transmits a request according to an operation by a user seeing a browser screen to the image display device.

However, the laser pointer conventionally used in a presentation has a problem such that the laser pointer itself has to be prepared, although it can be used simply and conveniently.

Further, a remote controller conventionally used as a device to remotely control an image display device is to control an image display device, and has a problem such that no consideration is paid for the use in a presentation.

In addition, in Patent Document 1 described above, a mobile terminal that is carried by a lot of users can be used as a remote controller for an image display device, and the operation content of the mobile terminal is directly reflected as an operation to the image display device. However, the mobile terminal is not appropriate for making a presentation using a laser pointer.

SUMMARY OF THE INVENTION

The present invention provides an image display device including: a projection unit that projects and displays an image onto a screen; a superimposed image drawing unit that generates a superimposed image which is to be displayed to be superimposed on the image; a browser storage unit that stores a browser screen for controlling a display position of the superimposed image from a mobile terminal; a transmission unit that transmits the browser screen stored in the browser storage unit to the mobile terminal; a reception unit that receives display position information of the superimposed image obtained by an operation on the browser screen displayed on the mobile terminal; and a control unit that displays the superimposed image, which is generated by the superimposed image drawing unit, so as to be superimposed on the image projected by the projection unit on the basis of the display position information of the superimposed image received by the reception unit.

DESCRIPTION OF THE PREFERRED EMBODIMENTS

The present invention provides an image display device including: a projection unit that projects and displays an image onto a screen; a superimposed image drawing unit that generates a superimposed image which is to be displayed to be superimposed on the image; a browser storage unit that stores a browser screen for controlling a display position of the superimposed image from a mobile terminal; a transmission unit that transmits the browser screen stored in the browser storage unit to the mobile terminal; a reception unit that receives display position information of the superimposed image obtained by an operation on the browser screen displayed on the mobile terminal; and a control unit that displays the superimposed image, which is generated by the superimposed image drawing unit, so as to be superimposed on the image projected by the projection unit on the basis of the display position information of the superimposed image received by the reception unit.

In the prevent invention, the superimposed image generated by the superimposed image drawing unit is a pointer icon.

In the prevent invention, the superimposed image generated by the superimposed image drawing unit is a mask image.

In the prevent invention, the browser screen includes a screen area corresponding to the screen.

In the prevent invention, the transmission unit and the reception unit have a wireless communication function for wirelessly establishing communication with the mobile terminal.

The present invention also provides an image display control method including: a projection step in which an image is projected and displayed on a screen; a superimposed image drawing step in which a superimposed image which is to be displayed to be superimposed on the image is generated; a transmission step in which a browser screen for controlling a display position of the superimposed image from a mobile terminal is transmitted to the mobile terminal; a reception step in which display position information of the superimposed image obtained by an operation on the browser screen displayed on the mobile terminal is received; and a display step in which the superimposed image generated in the superimposed image drawing step is displayed to be superimposed on the image projected on the screen on the basis of the display position information of the superimposed image received in the reception step.

The present invention also provides an image display system which includes: an image display device and a mobile terminal that is able to control a superimposed image displayed on an image projected by the image display device, wherein the image display device includes: a projection unit that projects and displays an image onto a screen; a superimposed image drawing unit that generates a superimposed image which is to be displayed to be superimposed on the image; a browser storage unit that stores a browser screen for controlling a display position of the superimposed image from a mobile terminal; a first transmission unit that transmits the browser screen stored in the browser storage unit to the mobile terminal; a first reception unit that receives display position information of the superimposed image obtained by an operation on the browser screen displayed on the mobile terminal; and a control unit that displays the superimposed image, which is generated by the superimposed image drawing unit, so as to be superimposed on the image projected by the projection unit on the basis of the display position information of the superimposed image received by the first reception unit, and the mobile terminal includes: a second reception unit that receives the browser screen transmitted from the image display device; a display unit that displays the browser screen received by the second reception unit; a touch detection unit that detects position coordinate information by an instruction on the browser screen displayed on the display unit; and a second transmission unit that transmits the position coordinate information detected by the touch detection unit to the image display device.

According to the present invention, the image display device receives display position information of the superimposed image obtained by an operation on the browser screen displayed on the mobile terminal, and the superimposed image generated by the superimposed image drawing unit is displayed to be superimposed on the image projected by the projection unit on the basis of the received display position information of the superimposed image. Thus, a speaker can operate the superimposed image on the image displayed on the screen using the mobile terminal in a presentation, a meeting, or the like, thereby being capable of providing an effective presentation.

In the embodiments described below, the same components are identified by the same reference numerals. The names and functions of these components are the same. Therefore, the detailed description for these components will not be repeated.

First Embodiment: Configuration of Image Display System

Figure 1:
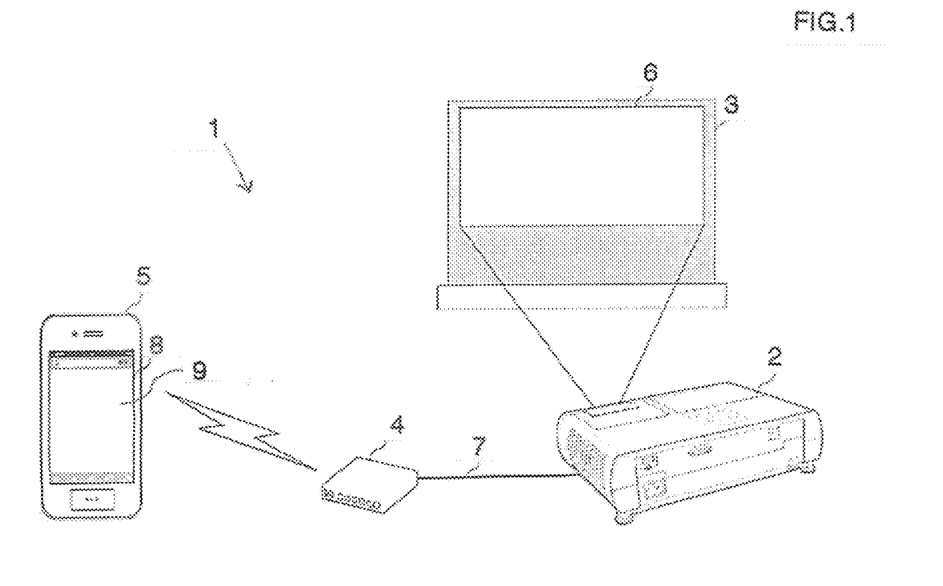
FIG. 1 is a diagram illustrating a configuration of an image display system according to a first embodiment of the present invention.

Referring to FIG. 1, an image display system 1 according to a first embodiment of the present invention includes an image display device 2, a screen 3, a wireless rooter 4, and a mobile terminal 5.

The image display device 2 is a projector that projects an image onto the screen 3, for example, and a projection image 6 is projected on the screen 3.

The mobile terminal 5 is a tablet device or a smartphone having a display unit 8 with a size of about 5 inches to 10 inches.

The wireless rooter 4 is connected to the image display device 2 with a cable 7, and connects a device, which can perform wireless communication, to a network (including LAN and Internet) not illustrated according to a predetermined communication protocol such as TCP/IP.

The mobile terminal 5 is connected to the network through the wireless rooter 4 to make an access to the image display device 2. Further, as described later, the present invention enables a user of the mobile terminal to display a pointer icon onto the projection image 6 on the screen 3 by operating a browser screen 9 displayed on the display unit 8 of the mobile terminal 5.

In the present embodiment, the wireless rooter 4 is separately provided. However, the present embodiment can be implemented by providing a wireless communication function to the image display device 2.

(Configuration of Image Display Device)

Figure 2:
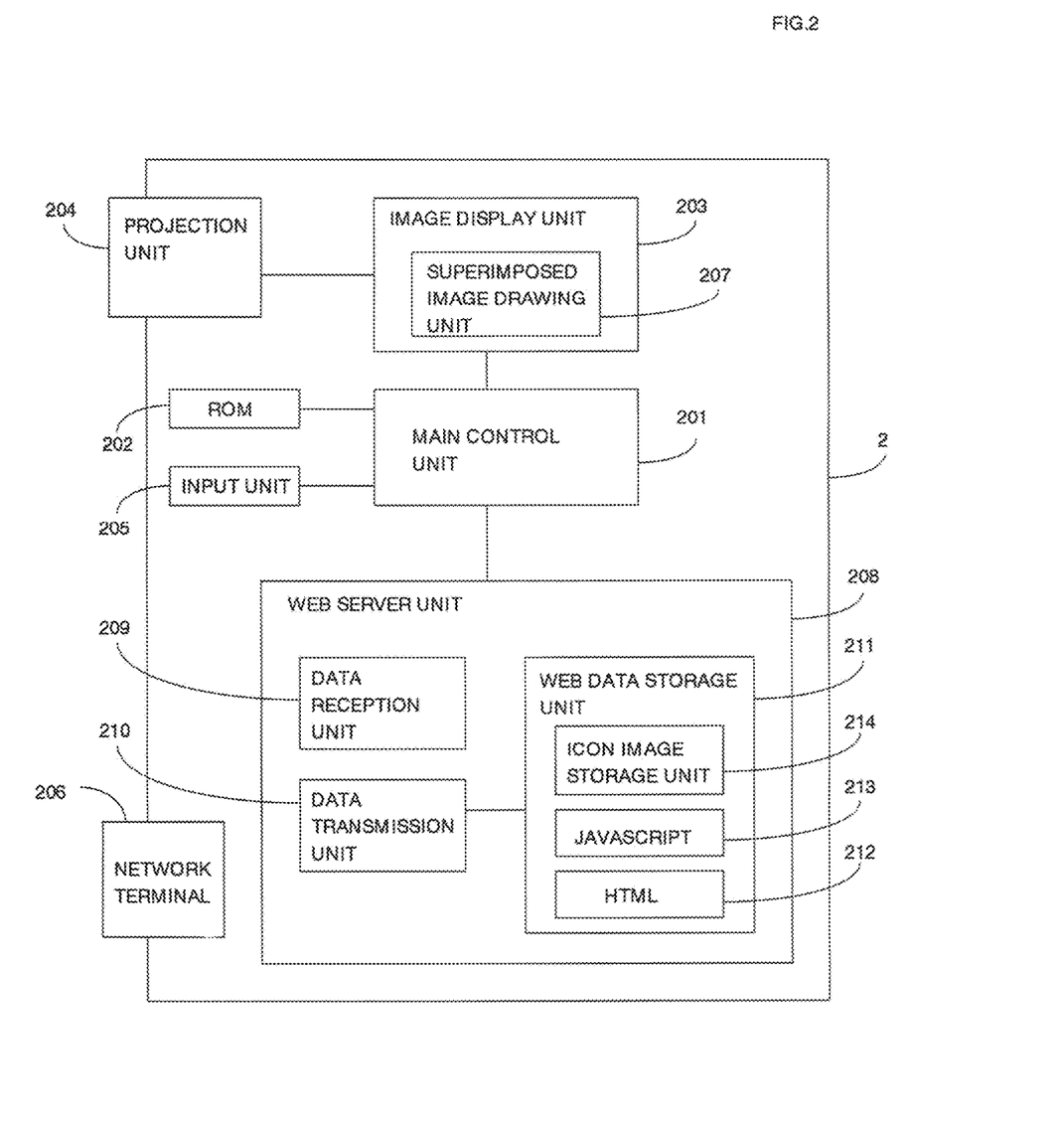
FIG. 2 is a block diagram illustrating a configuration of an image display device 2 according to the first embodiment of the present invention.

FIG. 2 is a block diagram illustrating the configuration of the image display device 2.

The image display device 2 includes a main control unit (control unit, hereinafter referred to as a CPU) 201 that entirely controls the image display device 2, a ROM (Read Only Memory) 202 that stores a program or the like to control the image display device 2, a screen display unit 203 that includes a liquid crystal display device and the like and generates a projection image, a projection unit 204 that enlarges and projects an image generated by the screen display unit 203 on the screen 3 as the projection image 6, an input unit 205 for inputting an image of an external device not illustrated, such as a personal computer, a network terminal 206 for connection with the wireless rooter 4, and a Web server unit 208.

The screen display unit 203 includes a superimposed image drawing unit 207, whereby a pointer icon as a superimposed image is projected through the projection unit on the basis of operation position information transmitted from the mobile terminal 5. The detail of the display operation of the pointer icon will be described later.

The superimposed image drawing unit 207 generates a superimposed image, which is displayed to be superimposed on the image that is projected and displayed, in order to display a superimposed image such as the pointer icon onto the image projected and displayed on the screen.

The projection unit 204 enlarges and displays the display image which is to be projected on the screen 3. The projection unit 204 is generally composed of a liquid crystal panel, a plurality of lenses, and a light source.

The Web server unit 208 (browser storage unit) is a processing unit that performs a connection process to the mobile terminal 5 that is connected through the wireless rooter 4. The Web server unit 208 includes a data reception unit 209 (first reception unit) that receives data transmitted from the mobile terminal 5, a data transmission unit 210 (first transmission unit) that transmits data to the mobile terminal 5, and a Web data storage unit 211 that generates and stores data which is to be transmitted to the mobile terminal 5.

The Web data storage unit 211 generates an operation screen that is to be transmitted to the mobile terminal 5, and includes an HTML (Hyper Text Markup Language) 212 that is a language for creating a document on a Web, a JavaScript® 213 that is a programming language for constructing a dynamic website in the HTML 212, and an icon image storage unit 214 that stores an icon used on the operation screen.

(Configuration of Mobile Terminal)

Figure 3:
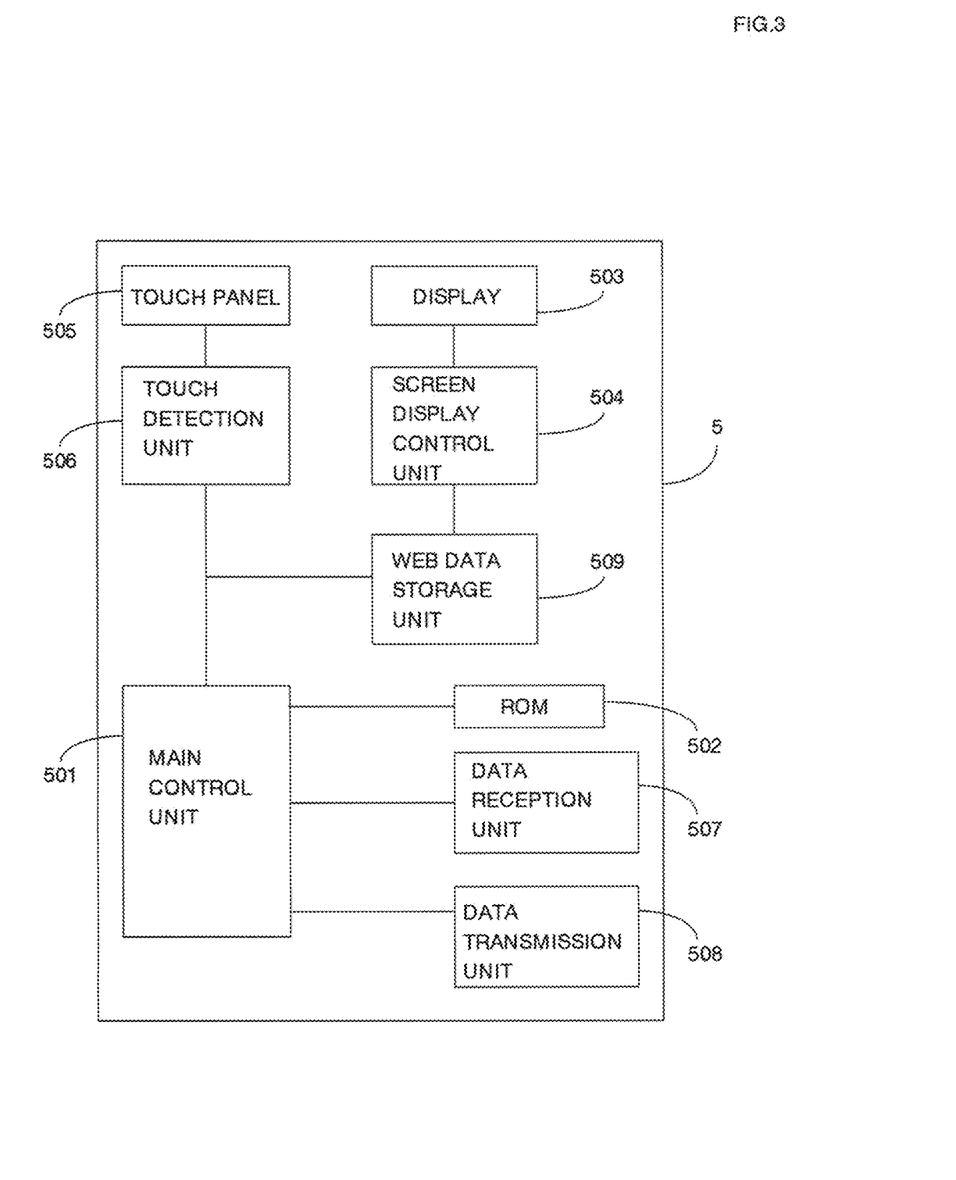
FIG. 3 is a block diagram illustrating a configuration of a mobile terminal 5 according to the first embodiment of the present invention.

FIG. 3 is a block diagram illustrating the configuration of the mobile terminal 5.

The mobile terminal 5 includes a main control unit (hereinafter referred to as a mobile CPU) 501 that entirely controls the mobile terminal 5, a ROM (Read Only Memory) 502 that stores a program or the like, a display 503 (display unit) composed of a liquid crystal display device or the like, a screen display control unit 504 that displays image data on the display 503, a touch panel 505 formed integral with the display, a touch detection unit 506 that detects a touch position coordinate when the touch panel 505 is touched by a finger or the like, a data reception unit 507 (second reception unit) that receives data transmitted from the image display device 2 through the wireless rooter 4, a data transmission unit 508 (second transmission unit) that transmits data to the image display device 2, and a Web data storage unit 509 that stores data received by the data reception unit 507.

(Explanation of Operation of Image Display System)

Figure 4:
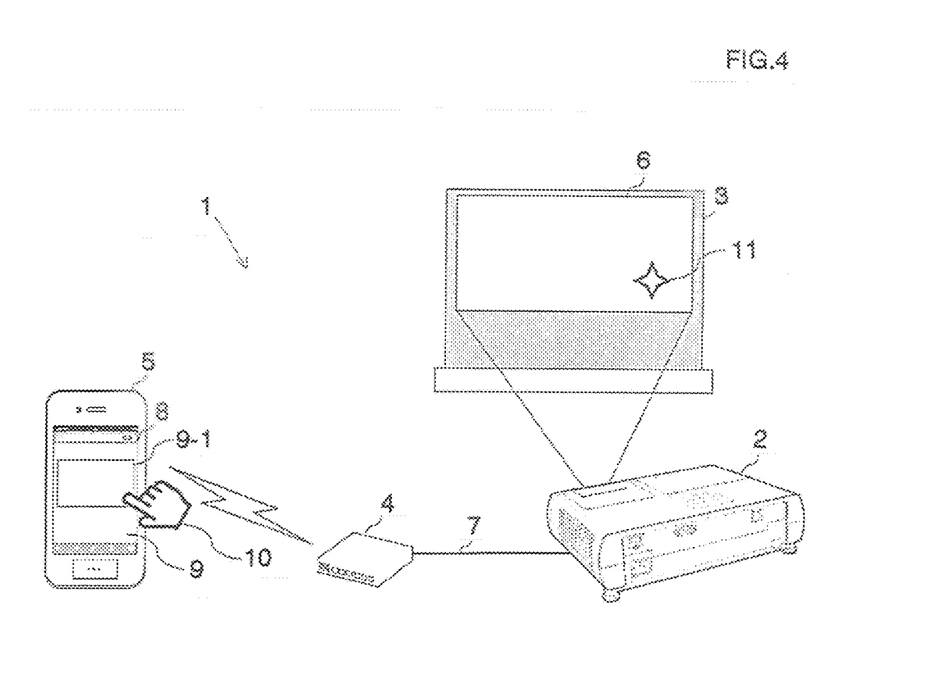
FIG. 4 is a conceptual view illustrating an operation of the image display system 1 according to the first embodiment of the present invention.

FIG. 4 is a conceptual view illustrating the operation of the image display system 1.

FIG. 4 illustrates that, in the configuration same as that in FIG. 1, when a screen area 9-1 of the browser screen 9 displayed on the display unit 8 of the mobile terminal 5 is touched by a finger 10, the coordinate position touched by the finger is detected, and the pointer icon 11 as the superimposed image is displayed at the position, which corresponds to the detected coordinate position, in the projection image 6 on the screen 3.

The operation of the image display system 1 according to the present invention will be described below with reference to FIGS. 5A to 8.

Figure 5A:
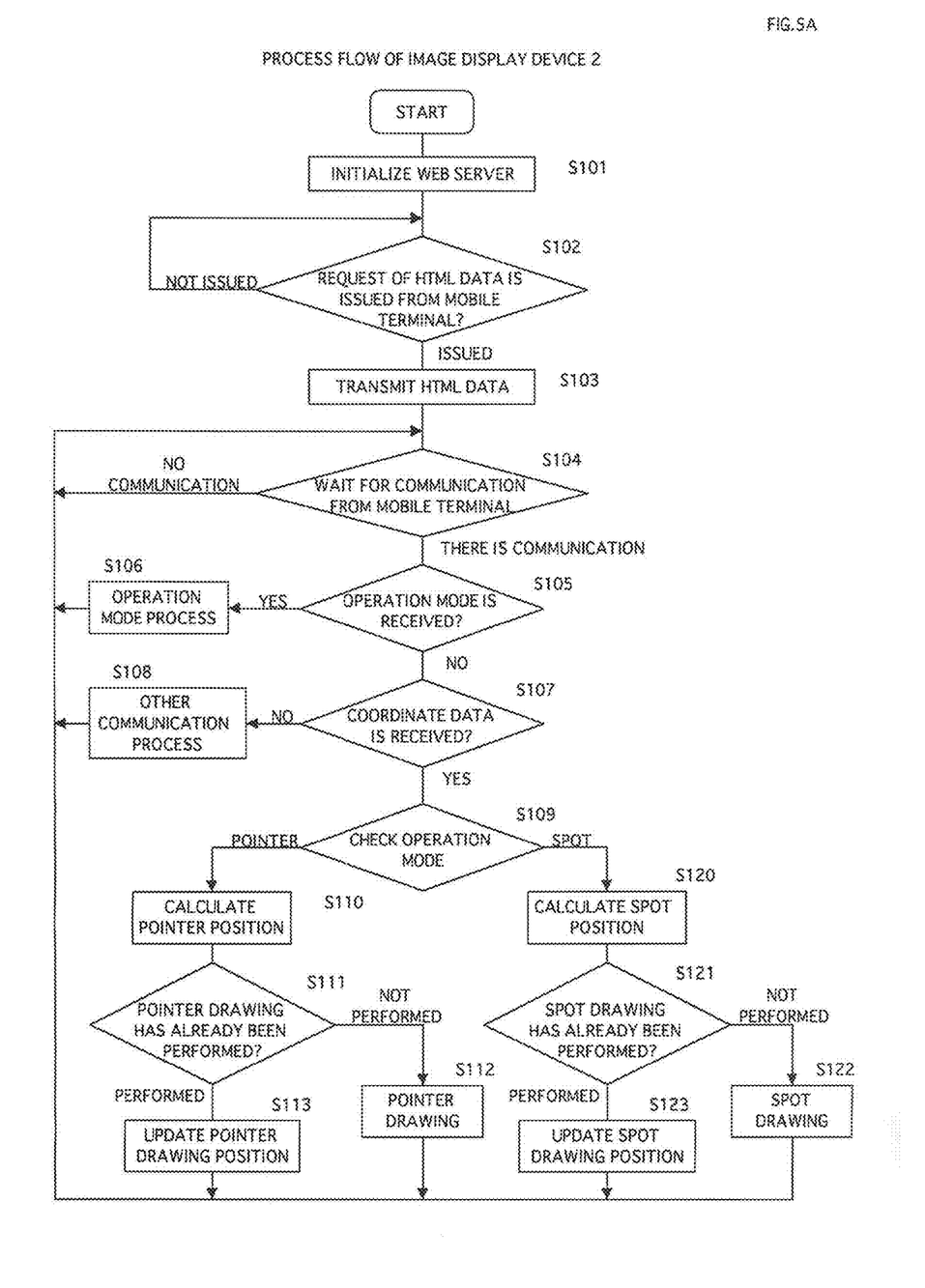
FIG. 5A is a flowchart illustrating the operation of the image display system 1 according to the first embodiment of the present invention.
Figure 5B:
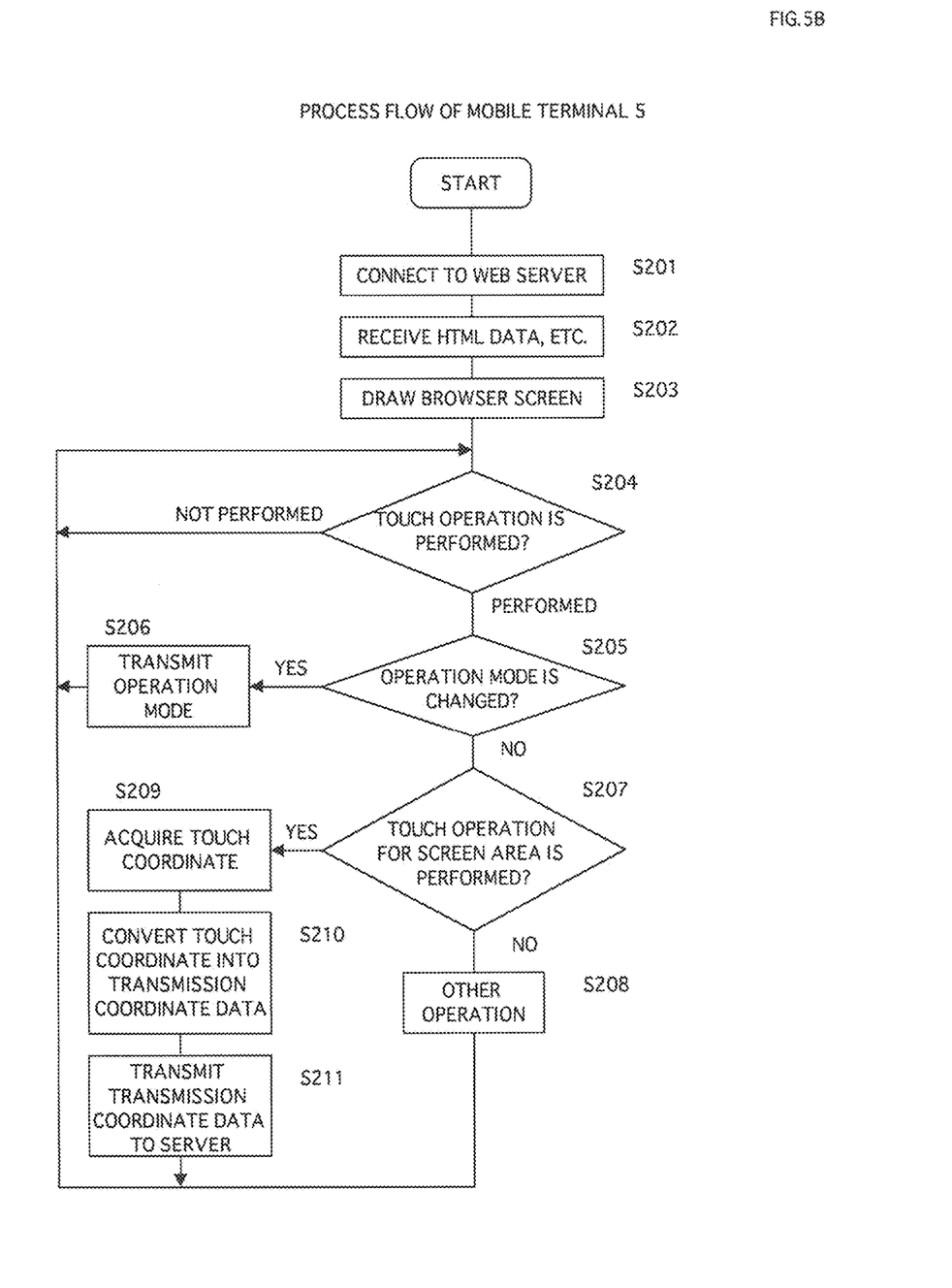
FIG. 5B is a flowchart illustrating the operation of the image display system 1 according to the first embodiment of the present invention.

FIG. 5A and FIG. 5B are a flowchart illustrating the operation of the image display system 1.

In FIG. 5A, steps S101 to S123 show the operation of the image display device 2, and in FIG. 5B, steps S201 to S211 show the operation of the mobile terminal 5.

Firstly, in step S101, the Web server unit 208 in the image display device 2 is initialized. It is supposed that, at that time, a power source of the image display device 2 has already been turned on, an image of an external device has been input from the input unit 205, and the projection image 6 has been projected on the screen 3 from the projection unit 204.

Next, in step S102, it is detected whether or not the request of HTML data is issued from the mobile terminal 5.

The image display device 2 is in a stand-by state until accepting the request of HTML data from the mobile terminal 5.

In step S201, the mobile terminal 5 is connected to the image display device (the Web server unit) by the operation on the mobile terminal 5.

The connection process is performed according to a known technology, and therefore, the description thereof will be omitted.

When the image display device 2 receives the request of HTML data from the mobile terminal 5 in step S102 of the image display device 2, the operation flow proceeds to step S103. In step S103, the HTML data read from the Web data storage unit 211 is transmitted to the mobile terminal 5.

When the mobile terminal 5 receives the HTML data from the image display device 2 in step S202 of the mobile terminal 5, the operation flow proceeds to step S203. In step S203, the browser screen 9 is drawn on the display unit 8. Then, the operation flow proceeds to step S204.

Figure 6:
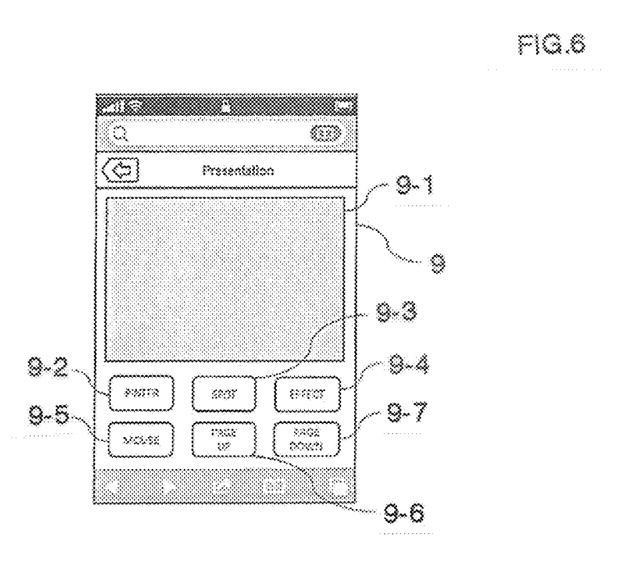
FIG. 6 is a view illustrating a specific example of a browser screen 9 of the mobile terminal 5 according to the first embodiment of the present invention.

FIG. 6 is a view illustrating a specific example of the browser screen 9 on the mobile terminal 5.

A screen area 9-1, a pointe key 9-2, a spot key 9-3, an effect key 9-4, a mouse key 9-5, a page up key 9-6, a page down key 9-7, and the like are arranged on the browser screen 9.

The other keys and other displays are not directly related to the present invention, so that the description thereof will be omitted.

In step S204, a touch operation for the browser screen 9 with a finger or the like is detected. When the touch operation is not detected, the mobile terminal 5 is brought into a stand-by state. On the other hand, when the touch operation is detected, the operation flow proceeds to step S205.

In step S205, it is determined whether or not the touch operation is for changing an operation mode. Specifically, in the case where the pointer key 9-2, the spot key 9-3, the effect key 9-4, the mouse key 9-5, the page up key 9-6, and the page down key 9-7 are touched, it is determined that the operation mode is performed, and the operation flow proceeds to step S206. In step S206, an operation mode signal including information of the touched key is transmitted to the image display device 2.

In the case other than the operation mode, the operation flow proceeds to step S207.

In step S104, the image display device 2 waits for communication from the mobile terminal 5.

When the image display device 2 receives the signal transmitted from the mobile terminal 5, the operation flow proceeds to step S105.

In step S105, it is determined whether or not the received signal is an operation mode signal. When the received signal is the operation mode signal, the operation flow proceeds to step S106. Otherwise, the operation flow proceeds to step S107.

In step S106, a process according to the received operation mode is performed.

For example, when the received operation mode is a page up operation, a process for scrolling up a page of the projected projection image is performed, and then, the operation flow returns to step S104.

In step S207, it is determined whether or not the touch operation is performed for the screen area 9-1. If the touch operation is performed for an area other than the touch screen area 9-1, the operation flow proceeds to step S208 where other processes are performed. If the touch operation is performed for the touch screen area 9-1, the operation flow proceeds to step S209.

In step S209, a touch coordinate of the touched position is acquired.

Figure 7:
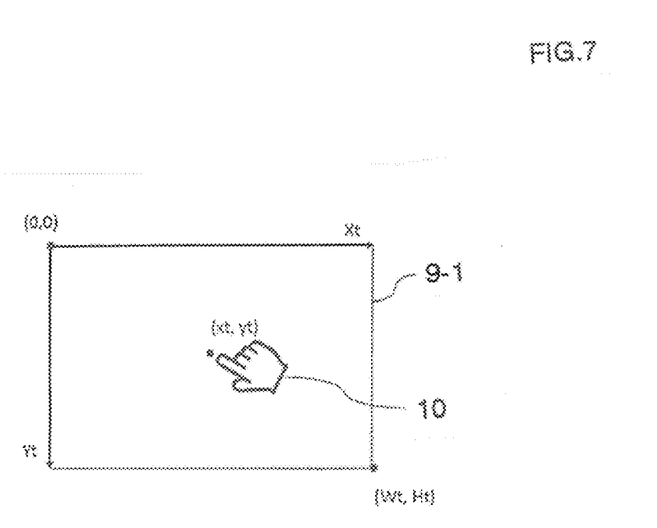
FIG. 7 is a view illustrating a touch state of the mobile terminal 5 according to the first embodiment of the present invention.

Specifically, the coordinate value when the position of (xt, yt) on the screen area 9-1 is touched as illustrated in FIG. 7 showing the touched state of the mobile terminal 5 is acquired.

The screen area 9-1 according to the present embodiment has a size of 800 in Wt (width) and 600 in Ht (height). The position of (xt, yt) is touched by the touch operation, and (xt, yt)=(400, 300) is acquired as the coordinate value at that time, for example.

Then, in step S210, a process of converting the touch coordinate acquired in step S209 into transmission coordinate data is performed.

Specifically, a value obtained by dividing the Wt (width) and Ht (height) into 256 is calculated as transmission coordinate data.

In the present embodiment, since the touch coordinate (xt, yt) is (400, 300), the transmission coordinate data is obtained from an equation of (xt1, yt1)=(256×(xt/800), 256×(yt/600)).

In the case of (xt, yt)=(400, 300), (xt1, yt1) becomes (128, 128).

In step S211, (128, 128) is transmitted to the image display device 2 (Web server unit) as the transmission coordinate data (xt1, yt1).

When the image display device 2 receives the transmission coordinate data from the mobile terminal in step S104, the operation flow proceeds to step S105. Since the signal is not the operation mode in step S105, the operation flow proceeds to step S107.

In step S107, when the received signal is not the coordinate data, the operation flow proceeds to step S108 where other processes are performed. On the other hand, when the received signal is the coordinate data, the operation flow proceeds to step S109.

In step S109, the operation mode of the image display device 2 is checked. If it is a pointer mode, the operation flow proceeds to step S110, and if it is a spot mode, the operation flow proceeds to step S120.

Notably, the present embodiment describes that the operation mode is supposed to be the pointer mode. The spot mode will be described later.

In step S110, the operation mode is the pointer mode, so that the image display device 2 calculates a display position of the pointer icon 11, which is a superimposed image displayed on the projection image, on the basis of the received coordinate data.

Figure 8:
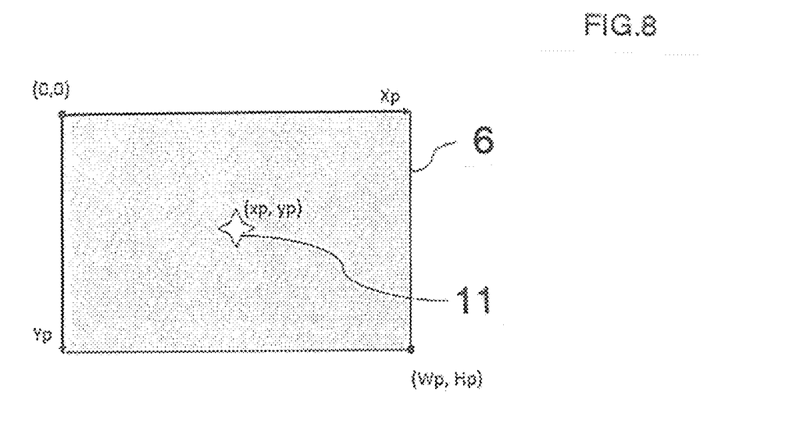
FIG. 8 is a view illustrating a relationship between a pointer icon 11 to a projection image 6 and respective coordinates according to the first embodiment of the present invention.

In the present embodiment, the projection image 6 is supposed to have a size of 1024 in Wp (width) and 768 in Hp (height). The image display device 2 obtains a display position (xp, yp) of the pointer icon which is to be displayed on the screen by utilizing the received coordinate data (xt1, yt1).

The (xp, yp) can be obtained according to the equation of (xt1×(1024/256), yt1×(768/256)).

In the present embodiment, since the received coordinate data (xt1, yt1) is (128, 128), (xp, yp) becomes (514, 386). Then, the operation flow proceeds to step S111.

In step S111, it is determined whether or not the pointer icon 11 serving as the superimposed image has already been displayed on the projection image 6. When the pointer icon 11 has not been displayed, the operation flow proceeds to step S112, and when the pointer icon 11 has already been displayed, it proceeds to step S113.

In step S112, a process of drawing the pointer icon 11 serving as the superimposed image on the projection image 6 is performed. After this process, the operation flow returns to step S104.

Specifically, the pointer icon 11, which has been stored in the icon image storage unit 214, is read. Next, the pointer icon 11 is drawn and displayed at the pointer display position (xp, yp) obtained by the calculation on the projection image which has already been displayed.

FIG. 8 is a view illustrating a relationship among the pointer icon 11 serving as the superimposed image on the projection image 6 and the respective coordinates.

In step S113, the image display device 2 performs a process of updating (moving) the display position on the basis of update coordinate data to the pointer icon 11 which has already been drawn, and then, operation flow returns to step S104.

According to the present invention, a browser screen that is usable as a remote controller is transmitted from the image display device 2 to the mobile terminal 5 that is not originally a remote controller of the image display device 2, and a user operates the screen area 9-1 on the browser screen displayed on the mobile terminal 5. When the user performs a desired operation on the mobile terminal 5, the pointer icon 11 can be drawn and displayed as the superimposed image on the projection image 6 displayed by the image display device 2, and further, the movement control of the pointer icon 11 is enabled. Thus, the convenience for a user in a presentation can significantly be enhanced.

Second Embodiment: Spot Display

Figure 9:
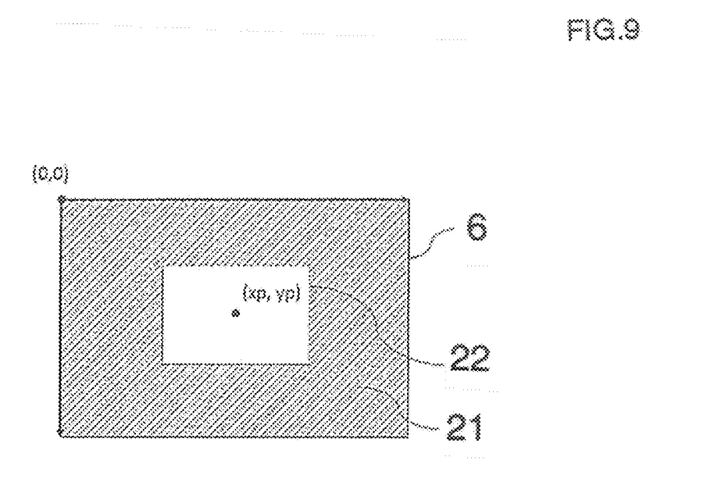
FIG. 9 is a view illustrating a display state of the projection image 6 when a spot display is performed by the image display device 2 according to a second embodiment of the present invention.

FIG. 9 is an explanatory view of a spot display with an image display system according to a second embodiment of the present invention.

FIG. 9 illustrates a display state in which a spot display is performed for the projection image 6 by the image display device 2.

FIG. 9 illustrates that a mask image is displayed as the superimposed image on the projection image 6. FIG. 9 indicates that a hatched region 21 corresponds to the mask image display as the superimposed image, and an input image is displayed on only a range of a spot area 22 at the central part.

The second embodiment is different from the first embodiment in that the spot key 9-3 on the mobile terminal 5 is depressed to activate a spot function. Further, the image display device 2 performs processes from step S120 to step S123 in FIG. 5 for performing a spot drawing.

In S120 in FIG. 5, a central coordinate of a spot position is calculated. The central coordinate is obtained by the calculation as in step S111, and then, the operation flow proceeds to step S121.

In step S121, it is determined whether or not a mask image display 21 serving as the superimposed image has already been performed on the projection image 6, that is, whether or not the spot drawing has been performed. If the spot drawing has not been performed, the operation flow proceeds to step S122, and if the spot drawing has already been performed, the operation flow proceeds to step S123.

In step S122, the spot drawing is performed. Firstly, a rectangular area with a predetermined size having the coordinate value (xp, yp) calculated in step S120 as a center is obtained. Then, display data corresponding to a mask image as the superimposed image is generated in order to display the mask image 21 in an area of the projection image other than the rectangular area, and the mask image 21 is displayed to be superimposed on the projection image 6. Then, the operation flow returns to step S104.

In step S123, the data of the mask image display is updated on the basis of update coordinate data to perform an updating process of the spot drawing position, and then, the operation flow returns to step S104.

In this case, the spot area is apparently moved, and the projection image displayed on the spot area becomes readable.

What is claimed is:

1. An image display device comprising:
   a projection unit that projects and displays an image onto a screen;
   a superimposed image drawing unit that generates a superimposed image which is to be displayed to be superimposed on the image;
   a reception unit that receives information related to an operation of the image display device from a mobile terminal communicably connected to the image display device; and
   a control unit that performs processing based on the information received by the reception unit, wherein when the information received by the reception unit is the display position information of the superimposed image and an operation mode of the image display device is a superimposed image display mode, the control unit displays the superimposed image, which is generated by the superimposed image drawing unit, so as to be superimposed on the image projected by the projection unit on the basis of the display position information of the superimposed image received by the reception unit.

2. The image display device according to claim 1, further comprising a position determination unit that determines a central position of a display position of the superimposed image.

3. The image display device according to claim 2, wherein when the superimposed image display mode is a spot mode, the projected image is displayed only in the range of the spot area whose center is the central position determined by the position determination unit.

4. The image display device according to claim 2, wherein the control unit superimposes and displays a mask image on the projected image, and the mask image is corresponding to a projected image area other than the size of a predetermined rectangular area centered on the central position determined by the position determination unit.

5. The image display device according to claim 1, wherein when the reception unit received the display position information of the superimposed image, if the superposed image is already displayed, the display position of the superimposed image is updated.

6. An image display method for an image display device comprising:
   a projection step in which an image is projected and displayed on a screen;
   a superimposed image drawing step in which a superimposed image which is to be displayed to be superimposed on the image is generated;
   a reception step in which information related to an operation of the image display device is received from a mobile terminal communicably connected to the image display device; and
   a control step in which process is performed based on the information received on the reception step;
   wherein when the information received on the reception step is the display position information of the superimposed image and an operation mode of the image display device is a superimposed image display mode, on the control step, the superimposed image is displayed, which is generated on the superimposed image drawing step, so as to be superimposed on the image projected on the projection step on the basis of the received display position information.

7. A non-transitory computer readable recording medium having stored a program for causing a computer mounted on an image display device to execute the following steps, wherein the steps comprise;
   a projection step in which an image is projected and displayed on a screen;
   a superimposed image drawing step in which a superimposed image which is to be displayed to be superimposed on the image is generated;
   a reception step in which information related to an operation of the image display device is received from a mobile terminal communicably connected to the image display device; and
   a control step in which process is performed based on the information received on the reception step;
   wherein when the information received on the reception step is the display position information of the superimposed image and an operation mode of the image display device is a superimposed image display mode, on the control step, the superimposed image is displayed, which is generated on the superimposed image drawing step, so as to be superimposed on the image projected on the projection step on the basis of the received display position information.

* * * * *